US007115034B2

(12) United States Patent
Kuwahara

(10) Patent No.: US 7,115,034 B2
(45) Date of Patent: Oct. 3, 2006

(54) INFORMATION PROCESSING SYSTEM THAT SEAMLESSLY CONNECTS REAL WORLD AND VIRTUAL WORLD

(75) Inventor: Toru Kuwahara, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 759 days.

(21) Appl. No.: 10/139,605

(22) Filed: May 3, 2002

(65) Prior Publication Data
US 2002/0188760 A1 Dec. 12, 2002

(30) Foreign Application Priority Data
May 10, 2001 (JP) ............................. 2001-139643
Mar. 18, 2002 (JP) ............................. 2002-074122

(51) Int. Cl.
*A63F 13/00* (2006.01)
(52) U.S. Cl. ...................................................... 463/42
(58) Field of Classification Search .................... 463/1, 463/25, 29, 42–43
See application file for complete search history.

(56) References Cited

U.S. PATENT DOCUMENTS 6,575,835 B1 *  6/2003  Mishina et al. ............... 463/42
2002/0069169 A1 *  6/2002  Sukeda et al. ................. 705/41

FOREIGN PATENT DOCUMENTS

| EP | 1 029 571 | 8/2000 |
|---|---|---|
| JP | 10-216361 | 8/1998 |
| JP | 2000-132484 | 5/2000 |
| JP | 2001-070658 | 3/2001 |

OTHER PUBLICATIONS

Zelda Elements-Ocarina of Time . . . About Big Goron Hug, Brother? wysiwyg://http://www.planetnintendo.com/Zelda/5.shtml pp. 1-3, XP-002266641.
Zelda 64 Instruction Manuel wysiwyg://41/http://then64zone.tripod.com/stuff/zeldabook.html pp. 1-17, XP-002266640, Nov. 23, 1998.
Notification of Reason for Refusal, May 10, 2004.
Keizo Hikawa. A Giant Site, Communication Desert for 500,000 peoples, 1,250 servers over 4.8 gigabit lines, Nikkei Communications, Japan. Nikkei Business Publications, Inc. Mar. 5, 2001,. No. 337, pp. 178-183.
Phantasy Star Online, Famitsu DC (Dreamcast), Japan, SEGA Corporation, Feb. 9, 2001, vol. 3, No. 2 (34-part series), pp. 46 to 51.

* cited by examiner

*Primary Examiner*—Kim Nguyen
(74) *Attorney, Agent, or Firm*—Katten Muchin Rosenman LLP

(57) ABSTRACT

A player moves point value in virtual world into an IC card and a service center updates the point value stored in the IC card based on a result of an event which the player performed in real world. As a result, information concerning the play of the player in the virtual world is updated based on the player's acts in the real world and a part of the virtual world is created based on the acts, which allows seamlessly connecting between the virtual world and the real world.

23 Claims, 3 Drawing Sheets

FIG. 2

| ITEM NAME | ITEM INFORMATION | NUMBER OF POINTS REQUIRED |
|---|---|---|

FIG. 3

| USER ID | PASSWORD | IC CARD NUMBER | USER ATTRIBUTE INFORMATION |
|---|---|---|---|

FIG. 4

| USER ID | IC CARD NUMBER | POINT UPDATED LOG | CURRENT NUMBER OF POINTS |
|---|---|---|---|

FIG. 5

| STORE ID | PASSWORD | ID NUMBER OF MERCHANT TERMINAL DEVICE | STORE ATTRIBUTE INFORMATION |
|---|---|---|---|

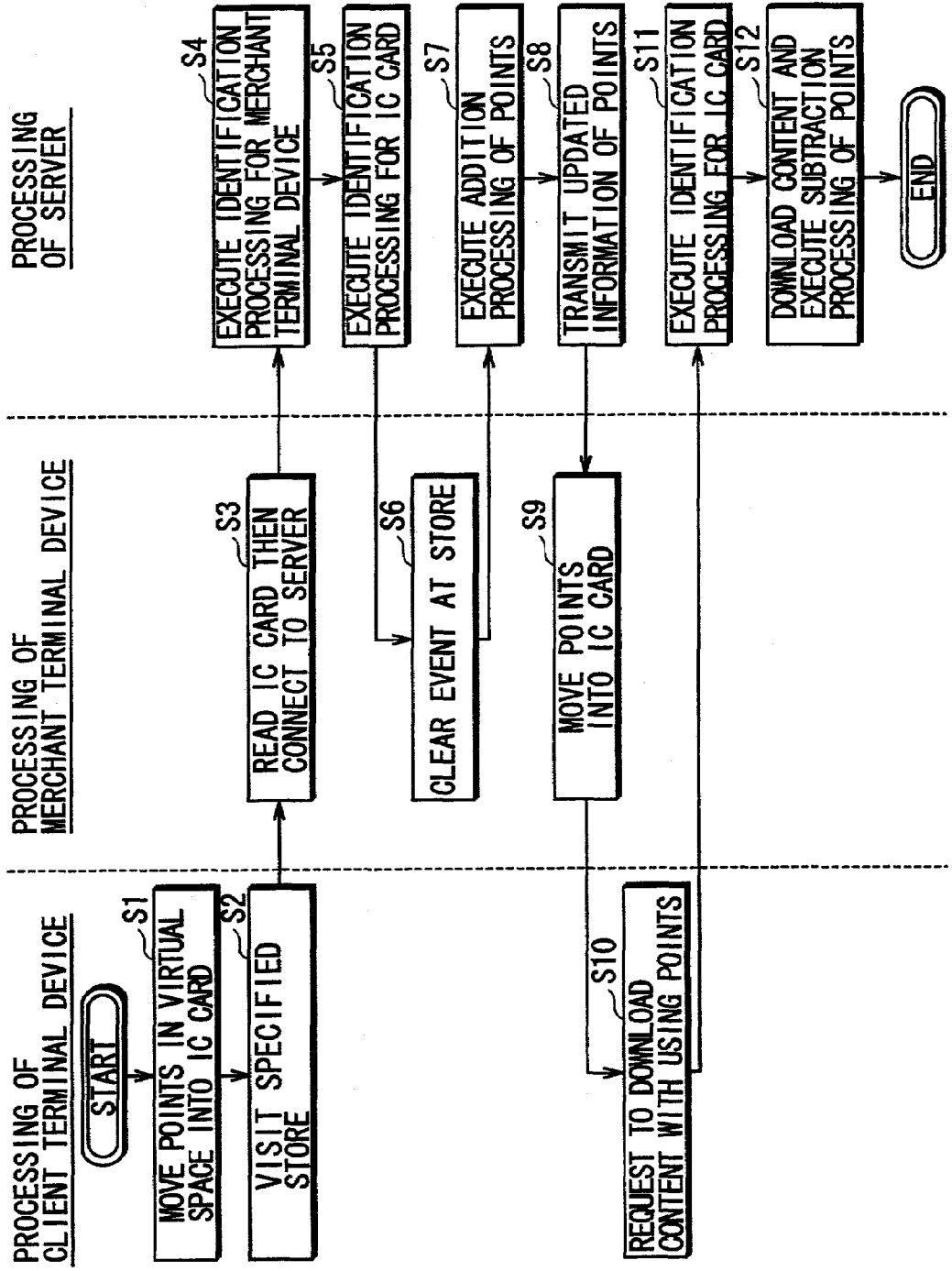

INFORMATION PROCESSING SYSTEM THAT SEAMLESSLY CONNECTS REAL WORLD AND VIRTUAL WORLD

This application is related to Japanese Patent Application No. 2001-139643 filed on May 10, 2001, and No. 2002-74122 filed on Mar. 18, 2002, based on which this application claims priority under the Paris Convention and the contents of which are incorporated herein by reference.

BACKGROUND OF THE INVENTION

1. Filed of the Invention

The present invention relates to an information processing system, an information processing method, an information processing program and a computer-readable recording medium having stored therein the information processing program, which are preferably applicable to a video game such as a role-playing game, battle-type action game or racing game, that a player plays in virtual world created by executing a game program.

2. Description of the Related Art

In the past, there has been provided various video games such as a role-playing game, battle-type action game or racing games, that a player plays operating an object in virtual world created by executing a game program.

However, the virtual world created in the video game is merely a virtual space which is realized on a client terminal device for executing the game program, where real world in which the player exists and the virtual world are completely separated. In order to solve such problem, although there was devised such that an existent person or company name appears in a scenario of the video game to bring the video game closer to reality, this is limited within the virtual world and has not come to connection of the virtual world and the real world.

SUMMARY OF THE INVENTION

The present invention takes such problems into consideration, and its object is to provide an information processing system, an information processing method, an information processing program and a computer-readable recording medium having stored therein the information processing program, which is capable of seamlessly connecting between virtual world and real world.

In one aspect of the present invention, a part of scenario of information processing is constructed so as to make a user execute a predetermined event in the real world, and the information processing is controlled so as to reflect the event-executed result to contents of the information processing. According to the present invention, a part of the content of the information processing is constructed based on user's acts in the real world, so that the virtual world developed by the information processing and the real world can be seamlessly connected.

Other and further objects and features of the present invention will become obvious upon understanding of the illustrative embodiment about to be described in connection with the accompanying drawings or will be indicated in the appended claims, and various advantages not referred to herein will occur to one skilled in the art upon employing of the invention in practice.

BRIEF DESCRIPTION OF DRAWINGS

FIG. 2 is a schematic diagram showing a data format of a service content database in FIG. 1.

FIG. 3 is a schematic diagram showing a data format of a client information database in FIG. 1.

FIG. 4 is a schematic diagram showing a data format of a point information database in FIG. 1.

FIG. 5 is a schematic diagram showing a data format of a merchant information database in FIG. 1.

FIG. 6 is a flowchart showing operation of the role-playing game system in FIG. 1.

DETAILED DESCRIPTION OF THE PREFERRED EMBODIMENTS

Figure 1:
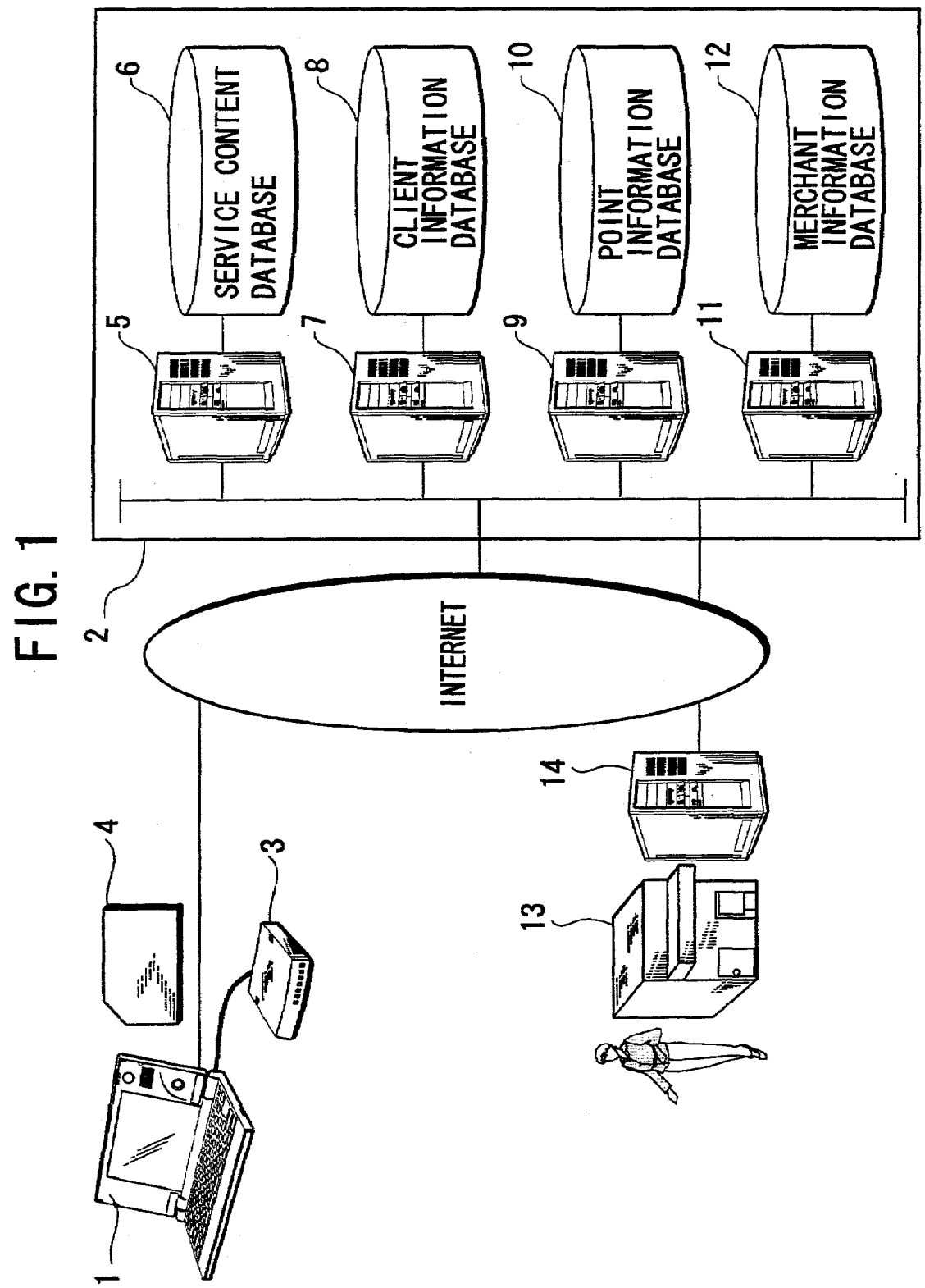
FIG. 1 is a schematic diagram showing an entire configuration of a role-playing game system which is an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

The present invention is applicable to a role-playing game system for connecting between virtual world created on a client terminal device and a store in real world through point value of a player in the virtual world which is stored in a IC card, as shown in FIG. 1.

Configuration of Role-Playing Game System

Firstly, the entire configuration of the role-playing game system which is an embodiment of the present invention will be described referring to FIG. 1.

As shown in FIG. 1, in this entertainment system, the client terminal device 1, a service center 2 and a merchant terminal device 14 provided at a store 13 in the real world are mutually connected via a predetermined network such as Internet so as to transmit and receive information therebetween.

As the client terminal device 1, a personal computer or a video game machine having communication function, PDA (Personal Digital Assistant), a portable telephone, an information communication terminal or the like can be applied. The client terminal device 1 creates the virtual world by executing the role-playing game program and proceeds with the role-playing game according to an instruction from a player.

The client terminal device 1 is connected with a controller through which the player instructs various processing to the client terminal device 1. In the case that the client terminal device 1 is the personal computer, input devices such as an input key, a keyboard or a mouse are used as the controller.

The client terminal device 1 is further connected with a reader-writer 3 used for reading and writing information from/to an IC chip which is embedded in an IC card 4 owned by the player.

The IC card 4 may be whatever types, such as a contacted type, un-contacted type, and magnetic card, as long as the reader-writer 3 is capable of reading and writing. Moreover, any type of medium, a portable telephone or a memory card as example, can be applied as long as the IC chip is embedded in.

In the IC chip of the IC card 4, information concerning game-play obtained by a player through playing the role-playing game is stored. In this embodiment, point value such as electric money or point value and information on the event instructed to player (flag information described later) is stored in the IC chip.

Game programs executed on the client terminal device 1 are those stored on a storing device in the client terminal device 1, besides those downloaded via the Internet or stored in a storage medium such as a CD-ROM or DVD-ROM. In the case where a game program to be executed is stored in the storage medium, the client terminal device 1 reads the game program through the use of a predetermined reading device to execute the program sequentially.

As for executing the game program, not the client terminal device 1, but a server machine may execute with the client terminal device 1 being connected via the Internet to the server machine provided at remote place, for example (so-called "a network game"). In this case, the client terminal device 1 displays the result of the program executed by the server machine on an output device.

In this embodiment, although the client terminal device 1 and the reader-writer 3 are configured independently, functions of the reader-writer 3 can be incorporated into the client terminal device 1 as example.

The service center 2 has a content server 5, an IC card identification server 7, a point server 9 and a store identification server 11, all of which are connected with the client terminal device and the merchant terminal device 14 via the Internet.

The content server 5 has a service content database 6 which stores various contents downloaded by the player via the Internet and download log of the player. The contents stored in the database 6 are items in virtual world, such as arms used in the role-playing game. Each item is stored into the database 6 in data format, which includes information such as name of an item, item information (in the case that the item is an arm, its performance for example), points required to purchase items, as shown in FIG. 2.

The IC card identification server 7 has a client information database 8 which stores information to identify a player who possesses the IC card 4. In the database 8, various information such as a player ID of each player, password for identifying, IC card number or attribute information (sexuality, blood type, date of birth, address and the like) is stored, as shown in FIG. 3.

The point server 9 has a point information database 10 which stores information regarding the point value of each player. In the database 10, information of a player's ID, IC card number, point updated log and current point value is stored for every player, as shown in FIG. 4.

The store identification server 11 has a merchant information database 12 which identifies the merchant terminal device 14. In the database 12, information of a store ID, password, ID number of the merchant terminal device 14, and attribute information of stores (ex. address, category of business) is stored for every store, as shown in FIG. 5.

The merchant terminal device 14 is composed of general computer systems and designed to connect to the service center 2 via the Internet. The merchant terminal device 14 is connected with the reader-writer for the IC card 4 as in the case of the client terminal device 1 to thereby read and write information from/to the IC card 4 which is brought with the player. The functions of the reader-writer can be incorporated into the merchant terminal device 14.

Thus, the role-playing game system is configured so that the point value obtained in the virtual world created on the client terminal device 1 can be updated on the merchant terminal device 14 provided at the store 13 in the real world under control of the service center 2.

Operation of the Role-Playing Game System

Next, the flow of seamlessly connecting between the virtual world created on the client terminal device and the store 13 in the real world (such flow will be referred to as seamless connection processing hereinafter) utilizing the role-playing game system, will be described referring to FIG. 6.

The flow of the flowchart shown in FIG. 6 is started where an event instruction to visit the store 13 in the real world is output according to a scenario while a player proceeds with the role-playing game on the client terminal device 1, and the processing advances to S1. It is noted that information output for the player can be those corresponding to events which the player performs in the real world, the information including a map of the store 13, contents of the events to be performed (for example, "Purchase items at the store 13") and the like.

In step S1, the player inserts the IC card 4 into the reader-writer 3, and instructs the client terminal device 1 by operating a controller to transfer the player's points of the virtual world into the IC card 4. In accordance with such instruction, the client terminal device 1 controls the reader-writer 3 to write the player's points of the virtual world into the IC card 4, and then the processing proceeds to step S2 from step S1.

It is to be understood here that how many points to be transferred into the IC card 4 may be specified by the player, or the client terminal device 1 may collectively transfer all the points of the player into the IC card 4 in accordance with the instruction from the player.

In addition, in the processing of step S1, role-playing game program may store information on the event instructed to player as flag information in the IC card 4. According to such flag information, when the player visit the specified store 13 with IC card 4, merchant terminal device 14 or service center 2 can recognize contents of the event the player should perform, and determine whether the player cleared the event.

In step S2, the player visits, with the IC card 4 in which the points are stored, the specified store 13 referring to the information (a map of the store 13 and the like) which is output from the client terminal device 1. Then, the processing proceeds to step S3 from step S2.

In the case, the client terminal device 1 is a portable information processing device which has a storage medium, the player can store the points and the flag information into the storage medium, and visit the specified store 13 with the device body.

In step S3, the player inserts the IC card 4 into the reader-writer which is provided at the store 13. When the IC card 4 is inserted into the reader-writer, the merchant terminal device 14 connects to the service center 2 via the Internet. Then, the processing proceeds to step S4 from step S3.

In step S4, the store identification server 11 requests the merchant terminal device 14 connected therewith to input a store ID and password for identifying the store 13. After input of the store ID and password by the merchant terminal device 14, the store identification server 11 determines whether the input is correct by referring to the merchant information database 12, thereby identifying the store 13. Then, the processing proceeds to step S5 from step S4.

In step S5, the IC card identification server 7 requests input of the player ID and the password for identifying the IC card 4. After input thereof by the merchant terminal device 14, IC card identification server 7 identifies the player who brought the IC card 4 by referring to the client information database 8. Then, the processing proceeds to step S6 from step S5.

In step S6, the player performs events directed in virtual world such that he or she carries out a conversation with a salesclerk of the store 13 or purchases the specified goods or items at the store 13, in accordance with the information output from the client terminal device 1. After the player clearing the events, the merchant terminal device 14 notifies the service center 2 of the effect that the player cleared the events. Then, the seamless connecting processing proceeds to step S7 from step S6.

In step S7, the point server 9 extracts point information of the player from the point information database 10 to change or update the points of the player responsive to contents of the events which the player cleared, and then the processing proceeds to step S8 from step S7.

In step S8, the point server 9 transmits the updated result of the points to the merchant terminal device 14, and then the processing proceeds to step S9 from step S8.

In step S9, the merchant terminal device 14 changes the point value stored in the IC chip of the IC card 4 in accordance with the information which is transmitted from the point server 9 by controlling the reader-writer 3. Then, the processing proceeds to step S10 from step S9.

In the case the flag information is stored in the IC card 4, the merchant terminal device 14 stores clear-information which shows the player cleared the event by controlling the reader-writer 3. The clear-information can be stored in the client information database 8.

In step S10, the player inserts the point updated IC card 4 into the reader-writer 3 which is connected to the client terminal device 1, thereafter requesting the client terminal device 1 through the controller to connect with the service center 2. Upon receiving the connection request from the player, the client terminal device 1 connects to the service center 2.

After completion of the connection between the client terminal device 1 and the service center 2, the player connects the client terminal device 1 with the content server by operating the controller to transmit a request for downloading a desired item referring to the service content database 6. Then, the processing proceeds to step S11 from step S10.

In step S11, IC card identification server 7 requests input of the player ID and the password to the player. After the input thereof, IC card identification server 7 determines whether the player ID and the password are correct with reference to the client information database 8, thereby identifying the player. Then, the processing proceeds to step S12 from step S11.

In step S12, the content server 5 executes download processing of item data into the client terminal device 1 in response to the completion of the authentication of the player by the IC card certification server 7 so as to update the download log of the player. The point server 9 subtracts the points corresponding to items downloaded by the player from the points currently possessed, referring to the service contents database 6.

Thereafter, the player plays again in the virtual world using the downloaded items, and then a series of the processing ends.

In the above embodiment, the player purchases items from the client terminal device 1, however, in the case where the specified event is to purchase the items at the store 13, the items can be purchased from the service content database 6 by connecting to the service center 2 via the merchant terminal device 14 at the store 13. In such case, the player executes the processes from S10 to S12 while operating the merchant terminal device 14.

Further, in the above embodiment, although the merchant terminal device 14 modified the point value stored in the IC card 4, the point server 9 may hold the updated point value in the point information database 10, and modify the point value when the player connected the client terminal device 1 with the service center 2.

As is clear from the foregoing description, a role-playing game system according to this embodiment allows a player to bring point value out from virtual world to real world, in which the point value in the virtual world is updated depending on an event-executed result of the player in the real world. Thereby, a part of scenario in virtual world is created based on the player's acts, and the gap between virtual world and real world can be eliminated.

Other Embodiments

Although the present invention has been described through its preferred embodiment, it is to be understood that the present invention is not intended to be limited to the above-described embodiment and drawings, and various changes or modifications may be made therein without departing from the scope and the technical sprit of the present invention.

For example, although the player brings the point value out from the virtual world to the real world in the above embodiments, the player may also bring out a virtual racing car tuned up in a racing game to the real world, which means allowing the player to utilize various information generated in the virtual world in the real world.

As another example, a reader writer for an IC card 4 can be provided at a concert hall, and the program may instruct a musician fan to go to the concert hall as an event to execute in the real world. In such case, the program stores the flag information that instructs the musician fan to go to the concert hall in the IC card 4. And, in case the musician fan inserts the IC card 4 into the reader-writer provided at the concert hall, the reader-writer stores the clear-information which shows the musician fan cleared the event into the IC card 4 referring with the stored flag information. Then, when the musician fan inserts the IC card 4 brought back from the concert hall into a reader-writer at home, the program allows to reproduce information (additional images) which the musician fan who cleared the specified event can only enjoy, such as concert images in a DVD.

As yet another example, a reader writer for an IC card 4 can be provided in an autograph session for a TV personality who released an image DVD, and the program may instruct a fan of the TV personality to go to the autograph session as an event to execute in the real world. In such case, the program stores the flag information that instructs the fan to go to the autograph session in the IC card 4. And, in case the fan inserts the IC card 4 into the reader-writer provided at the autograph session, the reader-writer stores the clear-information which shows the fan cleared the event into the IC card 4 referring with the stored flag information. Then, when the fan inserts the IC card 4 brought back from the autograph session into a reader-writer at home, the program allow to disclose information which the fan who cleared the specified event can only enjoy, such as images of the TV personality.

As still yet another example, a reader writer for an IC card 4 can be provided in an autograph session for an author of an electronic book written with text data, and the program may instruct a reader of the book to go to the autograph session as an event to execute in the real world. In such case, the program stores the flag information that instructs the reader to go to the autograph session in the IC card 4. And, in case the reader inserts the IC card 4 into the reader-writer provided at the autograph session, the reader-writer stores the clear-information which shows the reader cleared the event into the IC card 4 referring with the stored flag information. Then, when the reader inserts the IC card 4 brought back from the autograph session into a reader-writer at home, the program allow to disclose information which the reader who cleared the specified event can only enjoy, such as an epilogue of the book.

It is to be understood that operation of the role-playing game of the embodiment can be programmed and stored in a recording medium capable of being read by computer. On execution of the operation, a computer system reads the recording medium, stores the program into a storage area such as a memory in the computer system and executes the program by an operation unit. This realizes a video game system according to the embodiment of the present invention. It is noted here that the recording medium includes a computer-readable recording medium such as a semiconductor memory, magnetic disk, optical disk, magnet-optical disk, and magnetic tape.

What is claimed is:

1. An information processing system comprising:
    a first terminal device provided at a user side, for executing predetermined information processing including a process for causing a user to execute a predetermined event in the real world;
    portable storage means for storing a unique storage means identifier;
    a second terminal device placed in a predetermined place, the second terminal device being assigned a unique second device identifier and having means; and
    a server device connected to the first terminal device and the second terminal device via a predetermined network, the server device having certifying means and generating means, wherein:
    the input/output means of the second terminal device reads our the storage means identifier front the portable storage means;
    the second terminal device sends the second terminal device identifier and the storage means identifier to the server device;
    the certifying means of the server, including a database having pre-stored information that includes the storage means identifier and the second terminal device identifier, certifies the second terminal device identifier and the storage means identifier sent by the server device by referencing the pre-stored information in the database; and
    the generating means of the server device generates event completion information upon receiving a certification of the second terminal device identifier and the storage means identifier from the certifying means and an event completion notification from the second terminal device indicating that the user has executed the predetermined event.

2. The information processing system according to claim 1, wherein the predetermined information processing executed by the first terminal device is concerned with a video game.

3. The information processing system according to claim 2, wherein the predetermined event to be executed by the user is instructed while the user plays the video game on the first terminal device.

4. The information processing system according to claim 2, further comprising:
    modifying means for modifying information stored in the portable storage means in accordance with a result of the predetermined event; and
    controlling means provided at the user side, for controlling the information processing executed on the first terminal device based on the modified information stored in the portable storage means;
    wherein the modified information stored in the portable storage means represents a point value obtained by the user through playing the video game.

5. The information processing system according to claim 4, wherein the controlling means adds points to the point value stored in the portable storage means when the user clears the predetermined event.

6. The information processing system according to claim 4, wherein the controlling means subtracts points corresponded to a virtual item purchased by the user from the point value stored in the storage means when the user purchases the virtual item within the video game at an existing store with the point value stored in the storage means.

7. The information processing system according to claim 1, wherein the portable storage means is portable by the user.

8. An information processing method comprising the steps of:
    executing predetermined information processing by a first terminal device at a user side, the predetermined information processing including a process for causing a user to execute a predetermined event in the real world;
    storing a unique storage means identifier in a portable storage means;
    reading out the storage means identifier from the portable storage means by an input/output means of a second terminal device;
    sending the storage means identifier and a second terminal device identifier to a server device by a second terminal device; wherein
    the server device is connected to the first terminal device and the second terminal device via a predetermined network and includes certifying means and generating means:
    the certifying means of the server, including a database having pre-stored information that includes the storage means identifier and the second terminal device identifier, certifies the second terminal device identifier and the storage means identifier sent by The server device by referencing the pre-stored information in the database; and
    the generating means of the server device generates event completion information upon receiving a certification of the second terminal device identifier and the storage means identifier from the certifying means and an event completion notification from the second terminal device indicating that the user has executed the predetermined event.

9. The information processing method according to claim 8, further comprising the steps of:
    modifying information stored in the portable storage means in accordance with a result of the predetermined event; and
    controlling the information processing executed on the first terminal device based on the modified information stored in the portable storage means.

10. The information processing method according to claim 9, wherein the predetermined information processing executed by the first terminal device is concerned with a video game.

11. The information processing method according to claim 10, wherein the predetermined event to be executed by the user is instructed while the user plays the video game on the first terminal device.

12. The information processing method according to claim 10, wherein the modified information stored in the portable storage device represents a point value obtained by the user through playing the video game.

13. The information processing method according to claim 12, wherein the modifying step comprises a step of adding points to the point value when the user clears the predetermined event.

14. The information processing method according to claim 12, wherein the modifying step comprises a step of subtracting points corresponded to a virtual item purchased by the user from the point value when the user purchases the virtual item within the video game at an existing store with the point value.

15. A computer-readable storage medium having recorded therein an information processing program to be executed on a computer, wherein the information processing program performs the steps of:

executing predetermined information processing by a first terminal device at a user side, the predetermined information processing including a process for causing a user to execute a predetermined event in the real world;

storing a unique storage means identifier in a portable storage means;

reading out the storage means identifier from the portable storage means by an input/output means of a second terminal device;

sending the storage means identifier and a second terminal device identifier to a server device by a second terminal device; wherein The server device is connected to the first terminal device and the second terminal device via a predetermined network and includes certifying means and generating means:

the certifying means of the server, including a database having pre-stored information that includes the storage means identifier and the second terminal device identifier, certifies the second terminal device identifier and the storage means identifier sent by the server device by referencing the pre-stored information in the database; and the generating means of the server device generates event completion information upon receiving a certification of the second terminal device identifier and the storage means identifier from the certifying means and an event completion notification from the second terminal device indicating that the user has executed the predetermined event.

16. The computer-readable storage medium according to claim 15, wherein the information processing program further comprises the steps of:

modifying information stored in the portable storage means in accordance with a result of the predetermined event; and controlling the information processing executed on the first terminal device based on the modified information stored in the portable storage means of the information processing.

17. The computer-readable storage medium according to claim. 16, wherein the predetermined information processing executed by the first terminal device is concerned with a video game.

18. The computer-readable storage medium according to claim 17, wherein the predetermined event to he executed by the user is instructed while the user plays the video game on the terminal device.

19. The computer-readable storage medium according to claim 17, wherein the modified information stored in the portable storage device represents a point value obtained by the user through playing the video game.

20. The computer-readable storage medium according to claim 19, wherein the information processing program further comprises the step of:

adding points to the point value when the user clears the predetermined event.

21. The computer-readable storage medium according to claim 19, wherein the information processing program further comprises the step of: subtracting points corresponded to a virtual item purchased by the user from the point value when the user purchases the virtual item within the video game at an existing store with the point value.

22. An information processing system comprising:

a first terminal device provided at a user side, for executing predetermined information processing including a process for causing a user to execute a predetermined event in the real world;

a portable storage unit for storing a unique storage means identifier;

a modifying unit for modifying information stored in the portable storage unit in accordance with a result of the predetermined event; and a controlling unit provided at the user side, for controlling the information processing executed on the first terminal device based on the modified information stored in the portable storage unit;

wherein the modifying unit modifies the information stored in the portable storage unit upon receiving event completion notification from a server device connected to the modifying unit via a predetermined network.

23. An information processing method comprising the steps of:

executing, a: a firs; terminal device provided at a user side, predetermined information processing including a process for causing a user to execute a predetermined even: in the real world;

storing a unique storage means identifier in a portable storage unit;

modifying information stored by the portable storage unit in a modifying unit, in accordance with a result of the predetermined event; and controlling the information processing executed on the first terminal device in a controlling unit provided at the user side, based on the modified information stored in the portable storage unit;

wherein the modifying unit modifies the information stored in the portable storage unit upon receiving event completion notification from a server device connected to the modifying unit via a predetermined network.

* * * * *